(12) United States Patent
Coonce

(10) Patent No.: US 6,218,603 B1
(45) Date of Patent: Apr. 17, 2001

(54) NOTE LOCATOR FOR STRINGED INSTRUMENTS

(76) Inventor: Phillip R. Coonce, 12324 Pineridge, NE., Albuquerque, NM (US) 87112

( * ) Notice: Subject to any disclaimer, the term of this patent is extended or adjusted under 35 U.S.C. 154(b) by 0 days.

(21) Appl. No.: 09/457,413

(22) Filed: Dec. 7, 1999

Related U.S. Application Data (60) Provisional application No. 60/115,673, filed on Jan. 13, 1999.

(51) Int. Cl.[7] .................................................. G09B 15/00
(52) U.S. Cl. .................... 84/485 R; 84/470 R; 84/477 R
(58) Field of Search ............................. 84/485 R, 470 R, 84/471 R, 477 R, 314 R (56) References Cited

U.S. PATENT DOCUMENTS

| | | | |
|---|---|---|---|
| D. 264,477 | 5/1982 | Brent | D17/20 |
| D. 275,686 | 9/1984 | Beasley | D17/20 |
| 357,168 * | 2/1887 | Barnwell | 84/314 R |
| D. 370,939 | 6/1996 | Schaeffler | D20/11 |
| 494,698 * | 4/1893 | Zorger | 84/314 R |
| 3,619,470 | 11/1971 | Harris | 84/281 |
| 3,724,314 | 4/1973 | Columbo | 84/465 |
| 3,726,175 | 4/1973 | Kaplan | 84/470 |
| 3,726,176 | 4/1973 | Kaplan | 84/470 |
| 3,845,686 | 11/1974 | Salvo | 84/485 |
| 3,854,370 | 12/1974 | Sapinski | 84/485 |
| 3,978,756 | 9/1976 | Feldman | 84/470 |
| 3,978,757 | 9/1976 | Johnson, Jr. et al. | 84/485 R |
| 4,023,460 | 5/1977 | Kuhnke | 84/314 |
| 4,204,454 | 5/1980 | Severn | 84/315 |
| 4,286,495 | 9/1981 | Roof | 84/485 R |
| 4,291,606 | 9/1981 | Lepage | 84/291 |
| 4,417,497 | 11/1983 | Nicklaus | 84/485 R |
| 4,712,464 | 12/1987 | Nance | 84/485 R |
| 4,807,509 | 2/1989 | Graham | 84/314 R |
| 4,915,005 | 4/1990 | Schaffer et al. | 84/314 R |
| 5,345,851 | 9/1994 | Aalfs | 84/315 |
| 5,458,040 | 10/1995 | Lawrence, Jr. | 84/473 |
| 5,493,764 * | 2/1996 | Coppola | 29/402.09 |
| 5,920,023 | 7/1999 | Ravagni et al. | 84/485 |
| 5,945,618 * | 8/1999 | Bennett | 84/477 R |

FOREIGN PATENT DOCUMENTS

110959  * 10/1924 (CH) .

OTHER PUBLICATIONS

StarQuest Publishing, 1996.*
"Finger Tips" brochure by Rehder Studios, Winston–Salem, NC. 1986.
Sales letter for "Perfekt Noten" dated Aug. 25, 1999 from Barry Wright of Perfekt Noten, Rocky Mount, VA.
"The Suzuki Violinist" by William Starr. Kingston Ellis Press, Knoxville, TN, 1976.

* cited by examiner

*Primary Examiner*—Shih-Yung Hsieh
(74) *Attorney, Agent, or Firm*—Peacock, Myers & Adams, P.C.

(57) ABSTRACT

An apparatus and method for a note locator for stringed instruments, as well as a method of use, is presented. The application of acoustic laws allows calculation of the location for note position indicators upon the note locator. These locations are presented in a visual format. Note locator (10) comprises a flexible planar top and bottom surface wherein the top surface has note position indicators (60) of color and the bottom surface has an adhesive so that it can be placed beneath the strings of the instrument along the fingerboard without interfering with the normal operation of the instrument. Fingerboard alignment indicators (16, 18) aid in correct placement of the note locator. The user learns correct finger placement for playing the instrument by visually identifying colors with the notes of the equitempered chromatic scale. Diatonic scale note position indicators (32, 36, 38, 42, 46, 50, and 52) are indicated with various distinct colors while other half step note position indicators (30, 34, 40, 44, and 48) are indicated with a color different from that of the diatonic scale note position indicators.

60 Claims, 4 Drawing Sheets

NOTE LOCATOR FOR STRINGED INSTRUMENTS

CROSS-REFERENCE TO RELATED APPLICATIONS

This application claims the benefit of the filing of U.S. Provisional Patent Application Ser. No. 60/115,673, entitled "Note Locator for Stringed Instruments," filed on Jan. 13, 1999, and the specification thereof is incorporated herein by reference.

BACKGROUND OF THE INVENTION

1. Field of the Invention (Technical Field)

The present invention relates to the field of teaching aids for stringed instruments.

2. Background Art

Many stringed instruments, including the violin, viola, cello and stringed bass, necessitate that the player use his/her fingers to stop the strings against the fingerboard, thereby producing different notes. Given the absence of frets on these instruments, one of the most difficult issues for the novice is to learn the correct placement of the fingers on the string, so that the notes thus played sound in tune. Traditionally, students learn by trial and error, slowly training the auditory and tactile senses in order to achieve the proper finger positions. However, this is a long and arduous process often leading to frustration for the beginning student, as well as the teacher. Many devices have been invented to speed the novice's learning of the correct placement of the fingers.

The beginning student of stringed instruments faces two formidable challenges: the apprehension of basic musical material, and the acquisition of the instrumental technique necessary to play this material. The material of Western music comprises a set of twelve discrete musical tones known as the "chromatic scale." These notes can be named according to various systems: Do, Re, Mi, etc., or A, B, C through G, with the indications "sharp" or "flat," as necessary. Proceeding in sequence either up or down the chromatic scale, the thirteenth note takes the same name as the first, and is said to be its "octave." Continuing in the same direction repeats the cycle of twelve notes in another octave, with the range of audible frequencies being approximately eight octaves. However, in a composition, one note is usually selected to be the principal note, and the composition is said to be in the "key" of that note. To reinforce the principal note, various sets of notes called "scales" are utilized. Of many possible scales, the most common is called the "major scale," which is the set of seven of the twelve chromatic notes having specific relations to the principal note. This is most clearly seen at the piano keyboard, where the seven white keys in each octave together form the major scale starting on C, with the five black keys being extraneous to this scale. If a note other than C is selected as the principal note, a different set of seven notes is selected so as to always maintain the same distribution of tones relative to the principal note. One of the main tasks of a student of any instrument is to learn the specific notes necessary to play in a variety of different scales and keys.

U.S. Pat. No. 3,845,686, entitled "Intonation Guide for Player of String Instrument," trains the player's tactile sense by means of a signal element, a circuit therefor, and a series of pressure-activated tabs mounted on the fingerboard of the instrument. When the player places a finger, a tab closes a circuit which results in a signal to the player informing him or her as to the accuracy of the finger placement. This device necessitates extensive preparation of the fingerboard. The continual signaling proves to be a distraction to the player, and its complicated apparatus makes it both impractical and expensive for the novice.

Other devices teach the posture and use of the fingers without reference to specific locations along the string. These include those described in U.S. Pat. No. 3,619,470, to Harris, entitled "Hand-Positioning Device for Violinists;" U.S. Pat. No. 3,724,314, to Columbo, entitled "Finger Training Device for Stringed Musical Instruments;" U.S. Pat. No. 3,726,175, to Kaplan, entitled "Apparatus for Instruction of Stringed Instrument Positioning;" and U.S. Pat. No. 3,726,176, also to Kaplan, entitled "Apparatus for the Instruction of Hand Angulation in Playing Stringed Instruments." However, this approach is abstract, rather than concrete. The result of these inventions is that the player may indeed appear to have the proper technique while still playing badly out of tune.

Some patents disclose inventions aimed at reducing the possibility of error on the part of the player by restricting the notes which are possible to play. One such device, described in U.S. Pat. No. 4,023,460, to Kuhnke, entitled "Intonation Aid for the Violin, Viola and Cello and Other Instruments of the Violin Family," is a molded plastic sleeve containing a series of stops (essentially frets) which fits between the fingerboard of the instrument and the strings. When the string is depressed behind a stop, the correct note results. Unfortunately, the string vibrates against the plastic, producing an unwanted buzzing. Since the stop is raised, the string tends to roll underneath the player's finger, thereby undermining the very precision which the device aims to improve. Additionally, the player must place his/her finger behind the stop, thereby learning a placement of the fingers distinct from that of the instrument without this device. Similarly, the device described in U.S. Pat. No. 5,345,851, to Aalfs, entitled "Articulated Fingerboard for a Stringed Musical Instrument," is a fingerboard with a plurality of raised areas which define the discrete locations where the player must place the fingers. With this device it is difficult to play out of tune, but due to the alternation of raised and lowered surfaces, it is also difficult to move the finger along the length of the string. The device disclosed in U.S. Pat. No. 4,204,454, to Severn, entitled "Instructional Apparatus for Stringed Instrument," features a keyboard placed over the strings of the instrument which operates a series of depressible plungers which stop the string. In this case, the fingers operate the device, rather than the musical instrument, and have no contact with the string itself. These three devices suffer from the generic defect that the technique thus cultivated is distinct from that which is used for the playing of the instruments in their common form.

Other devices provide visual clues to the player. U.S. Pat. No. 4,417,497, to Nicklaus, entitled "Stringed Musical Instrument Teaching Device and Process," describes a fingerboard bearing a metal rack into which are placed magnetized trapezoidal markers, each of which defines an area for the placement of the fingers and which bears the name of the note thus created. The fact that the markers define a relatively wide area of the fingerboard (1 cm or more) results in a great imprecision. Also, the necessity of variously applying and removing the markers makes it cumbersome. Having a similar feature and suffering similar defects is the device receiving U.S. Pat. No. 4,291,606, to LePage, entitled "Musical String Instrument." This device features rectangular pieces of contrasting colors secured to the fretboard between each fret. The device revealed in U.S. Pat. No.

4,712,464, to Kregg, entitled "Stringed Instrument Finger Positioning Guide," is a rigid flat surface affixed beneath the strings of a fretted musical instrument and which bears colored spots to mark the finger positions for playing a variety of chords. The fact that this device is flat and bears slots to engage the nut and frets of the instrument makes it unsuitable for the curved and fretless fingerboards of the violin family. Similarly, the device receiving U.S. Pat. No. 5,458,040, to Glucker et al., entitled "Teaching Device for Stringed Instruments," is a mock fretboard external to the instrument which bears template cards illustrating note positions and is used for practice.

Certain devices, including U.S. Pat. No. 3,854,370, to Sapinski, entitled "Training Aid for Stringed Musical Instrument;" U.S. Pat. No. 4,286,495, to Roof, entitled "Musical Instrument Training Device;" and U.S. Pat. No. 4,807,509, to Graham, entitled "Electroluminescent Fret Grid for Stringed Instruments" are electrical devices which use luminescent displays to mark the notes on the fingerboard. These devices are expensive and complicated, and involve a radical reconfiguration of the instrument itself.

The devices disclosed in U.S. Pat. No. 3,978,756, to Feldman, entitled "Guitar Instruction System;" U.S. Pat. No. 3,978,757, to Johnson et al., entitled "Instructional Display Device Operated Responsive to the Playing of Stringed Musical Instruments," and U.S. Pat. No. 4,915,005, to Shaffer et al., entitled "Fingering Display for Musical Instrument" are various types of note displays external to the instrument. These devices demand that the player attend to a device external to the instrument, thereby preventing the complete and total concentration on the task of playing. The Feldman device includes indiciae comprising the note names which underly the strings of a guitar so as to inform the player as to which notes result when the finger is in a given location.

Other attempts to simplify the learning process include "Fingertips," Copyright 1986, and the extremely similar "Perfekt Noten." Both devices are made of adhesive-backed paper, attach to the fingerboard of the instrument, and feature both note indicator lines and note letter names (A, F-sharp, etc.) printed in white on a black background. As both devices utilize the same scheme of lines plus note names, label the identical set of twenty-eight notes in the first octave (out of a possible forty-eight notes), and utilize very similar fonts, the only substantial difference between them is that "Fingertips" uses a combination of dashed, dotted and solid lines, whereas "Perfekt Noten" utilizes only solid lines. Both devices suffer from similar defects: paper is easily abraded, and the items fit only on the top surface of the fingerboard, thus making them prone to slippage. Also, measurements tend to indicate that from an acoustical point of view, these devices are simply not accurate as to the placement of notes. Most seriously, the presentation of a large quantity of information (lines and letters) in the stark contrast of black and white makes visual apprehension, discrimination and retention very problematic for the beginner, thus defeating the goal of simplifying the initial learning process.

Many teachers of the violin affix strips of 0.6 cm or wider tape to the fingerboard in order to give the student a visual cue for the location of the fingers. (This is frequently described in the professional literature, for example, William Starr, *The Suzuki Violinist,* Kingston Ellis Press, 1976, p. 65.) Problems with this method include the rather time-consuming process of applying numerous individual tapes and the difficulty of exact placement of the tapes. Even when well placed, such tapes are a very imprecise guide as to the location of the fingers, since they are extremely wide when compared to the necessary precision of finger placement.

Devices of a decorative nature have been patented for various stringed instruments, including the violin. U.S. Pat. No. D264,477, to Brent, entitled "Guitar Fretboard or the Like;" U.S. Pat. No. D275,686, to Beasley, entitled "Decal for Violin or the Like;" and U.S. Pat. No. D370,939, to Schaeffler, entitled "Decal for a Guitar Neck." Each of these is purely decorative in nature and none have a functional aspect.

The present invention overcomes the limitations of the prior art discussed above. It is computer-designed utilizing the laws of acoustics so as to guarantee accuracy of note location, identifies those locations with note position indicators, utilizes colors to visually discriminate between the note locations, and does not indicate note letter names for the user. It is more professional, produces much less visual clutter, and trains the user visually based upon color. The present invention is a note locator for stringed instruments having a flexible planar surface with color note position indicators that give the user easily identifiable visual references for positioning the fingers on the strings of the instrument rather than explicit note names or tangible mechanical stops or obstructions which train the user to rely on them as opposed to independently acquiring finger placement locations. The apparatus is preferably adhesively affixed to the fingerboard of the stringed instrument and has sufficient additional material for overhang to wrap around the fingerboard to stabilize the device on the curved fingerboard of the instrument. The present invention indicates precise locations for where the notes are to be played on the strings and provides this information in a manner easily ascertained by novices. The apparatus and its method of use cultivates the commonly used finger action and technique for stringed instruments. The present invention indicates to the user both the specific placement of the fingers, and, through the arrangement of colors, the musical structure of scales. In the preferred embodiment, the present invention is easily applied to the instrument, does not adversely affect the production of sound, and does not damage the instrument in any way.

SUMMARY OF THE INVENTION
(DISCLOSURE OF THE INVENTION)

The present invention is a note locator for stringed instruments and comprises a planar top surface having a contrasting background and at least one note position indicator of a color, other than or in addition to the color white, and a planar bottom surface. The note locator preferably has a plurality of note position indicators of various colors. There are no note names printed adjacent the color note position indicators upon the note locator. Preferably, the note position indicators have at least one diatonic scale note position indicator and at least one other half step note position indicator. The diatonic scale note position indicators are comprised of at least one color and the other half step indicators are of another color that is different from any of the colors of the diatonic scale note position indicators. Preferably, the diatonic scale note position indicators are of various colors wherein no two colors are alike, and the other half step note position indicators are white.

The note position indicators are between approximately 0.36 mm and 2.82 mm wide, preferably they are 0.71 mm wide. To cover the twelve notes of the equitempered scale, there are preferably twelve note position indicators upon the note locator; seven diatonic scale note position indicators and five other half step note position indicators.

The note position indicators are contrasted with a contrasting background that is preferably a transparent material. The planar bottom surface preferably has means for attaching the bottom surface to the stringed instrument fingerboard. Preferably, a reusable adhesive is used for attaching the note locator to the fingerboard securely but not permanently. A backing can be used to protect the adhesive prior to attaching the note locator to the fingerboard.

The planar top surface and planar bottom surface comprise an integrally planar trapezoidal apparatus having length greater than width so as to align along the fingerboard of a stringed instrument. The narrower end of the note locator has an approximate width of either 16.7 mm, 17.5 mm, 19.1 mm, 23.8 mm, 25.4 mm, 28.6 mm, 31.8 mm, 39.7 mm, 41.3 mm, 50.8 mm, or 54.0 mm. The wider end of the note locator has an approximate width of either 22.2 mm, 25.4 mm, 27.0 mm, 33.3 mm, 39.7 mm, 44.4 mm, 47.6 mm, 55.6 mm, 60.3 mm, 76.2 mm, 82.6 mm, or 85.7 mm. For the full-sized violin embodiment, the note locator has at least one note position indicator, each located at an approximate distance from the narrower end of the note locator, and these distances are calculated to be approximately 18.4 mm, 35.8 mm, 52.1 mm, 67.6 mm, 82.2 mm, 96.0 mm, 109.0 mm, 121.3 mm, 132.9 mm, 143.8 mm, 154.1 mm, and 163.9 mm.

The note locator also has fingerboard alignment indicators inset from the sides of the note locator upon the planar top surface. The fingerboard alignment indicators are preferably between approximately 0.71 mm and 4.24 mm wide. The fingerboard alignment indicators are also preferably inset from the sides of the note locator by varying distances depending on the stringed instrument for which the note locator is made. These inset distances include 3.2 mm, 4.8 mm, 6.4 mm, 7.9 mm, and 9.5 mm.

The note locator may be constructed with dimensions that will accommodate all varieties of stringed instruments, including violins, violas, viols, cellos, and basses. The note locator can also be made to accommodate guitars, mandolins, ukuleles, banjos, and lutes.

To calculate an accurate distance for placement locations of the note position indicators, a formula is presented. In this formula, L is the sounding string length for the stringed instrument, K is the twelfth root of two, and $A_n$ is the distance from the nut of the stringed instrument to the respective note position indicator n. The placement distance for each note position indicator is calculated by $A_n = L - (L/K^n)$. In this formula, L can be the sounding string length for stringed instruments such as violins, violas, viols, cellos, and basses. Preferably, L is an approximate value equal to either 192.9 mm, 218.3 mm, 243.7 mm, 265.1 mm, 282.3 mm, 306.4 mm, 328 mm, 362.0 mm, 495.3 mm, 590.6 mm, 631.8 mm, 876.3 mm, 1,003.3 mm, or 1,066.8 mm. L can also take the value of the sounding string length for stringed instruments such as guitars, mandolins, ukuleles, banjos, and lutes. Most preferably, n assumes the integer values 1 through and including 12.

Alternatively, the positions for the note position indicators for various other stringed instruments can be calculated by scaling the note position indicator positions for the full-sized violin. Scaling factors may include 0.59, 0.67, 0.75, 0.81, 0.86, 0.94, 1.1, 1.5, 1.8, 1.9, 2.1, 2.7, 3.1, and 3.3.

The present invention is a note locator for stringed instruments preferably comprising a planar flexible surface having at least one note position indicator of color, a contrasting background to the at least one note position indicator of color, fingerboard alignment indicators, and means for attaching the planar flexible surface to a stringed instrument fingerboard. The at least one note position indicator of color preferably comprises at least one diatonic scale note position indicator of various colors wherein no two colors are alike, and at least one other half step note position indicator of a color different from any color of the at least one diatonic scale note position indicator.

The present invention is also a method of indicating note locations upon stringed instruments and comprises the steps of assigning at least one note position indicator with a color other than or in addition to the color white upon a planar surface, and contrasting the at least one note position indicator of color with a background. When assigning the at least one note position indicator with a color upon the planar surface, note names are omitted adjacent the at least one note position indicators. The step of assigning the at least one note position indicator with colors upon a planar surface comprises assigning at least one diatonic scale note position indicator and at least one other half step note position indicator with a color. This includes coloring the at least one diatonic scale note position indicators with distinct colors and coloring each of the at least one other half step note position indicators with a color that is different from those of the at least one diatonic scale note position indicator. Preferably, the diatonic scale note position indicators are colored with distinct colors wherein no two colors are alike, and the other half step note position indicators are colored white. In addition to assigning the at least one note position indicator with color upon a planar surface, twelve note position indicators of color are placed upon the planar surface. Preferably, seven diatonic scale note position indicators are placed on the surface, as well as five other half step note position indicators of a single color different from those of the seven diatonic scale note position indicators. Additionally, the method comprises the step of contrasting the note position indicators of color with a transparent background.

The method also comprises the step of aligning the planar surface having the at least one note position indicator of color along a stringed instrument fingerboard and attaching the planar surface to the stringed instrument fingerboard. Preferably, the attaching is accomplished with an adhesive, and most preferably it is attached securely but not permanently. The method also includes protecting the adhesive with a backing prior to attaching the note locator to the stringed instrument fingerboard. Additionally, the method includes the step of shaping the planar surface having the at least one note position indicator of color so that it is trapezoidal and has length greater than width for alignment along the fingerboard of a stringed instrument. The step of shaping the planar surface so that it is trapezoidal preferably comprises the steps of shaping the planar surface so that it has a narrower end and a wider end.

The method of indicating note locations upon stringed instruments further comprises the step of locating the note position indicators at distances from the narrower end of the note locator, calculated to include the distances 18.4 mm, 35.8 mm, 52.1 mm, 67.6 mm, 82.2 mm, 96.0 mm, 109.0 mm, 121.3 mm, 132.9 mm, 143.8 mm, 154.1 mm, and 163.9 mm. The method of indicating note locations upon stringed instruments further comprises the step of attaching the planar surface having the at least one note position indicator of color upon either a violin, viola, viol, cello, or bass. The method also includes the step of attaching the note locator upon stringed instruments such as guitars, mandolins, ukuleles, banjos and lutes.

The method of indicating note locations notes upon stringed instruments further comprises the steps of representing the at least one note position indicator of color by n where n is the integers 1, 2, 3, . . . , and locating the note position indicators upon the note locator according to the formula $$A_n = L - \frac{L}{K^n}$$

where $A_n$ is the distance from the nut of the stringed instrument, or narrow end of the note locator, $K=2^{1/12}$ and L equals the sounding string length, which is the total string length from the bridge to the nut, for the stringed instrument. The method also includes the step of assigning L the value of the sounding string length for stringed instruments such as violins, violas, viols, cellos, and basses. The method can also include the step of assigning L an approximate value from the list of values including 192.9 mm, 218.3 mm, 243.7 mm, 265.1 mm, 282.3 mm, 306.4 mm, 328 mm, 362.0 mm, 495.3 mm, 590.6 mm, 631.8 mm, 698.5 mm, 876.3 mm, 1,003.3 mm, and 1066.8 mm. The method can also include the step of assigning L the value of the sounding string length of stringed instruments such as guitars, mandolins, ukuleles, banjos and lutes. The step of representing the at least one note position indicator of color by n preferably comprises assigning n the integer values 1 through and including 12.

Another method of adapting the note locator note position indicator placement positions to various other stringed instruments can be accomplished by assigning L the sounding string length for the full-sized violin; scaling the locations of the note position indicators by an approximate scaling factor derived from the ratio of the instrument's string length to that of the full-sized violin; and adapting the note locator for various other stringed instruments by locating the note position indicators upon the note locator at a distance from the nut of the stringed instrument calculated using the approximate scaling factor.

A method of indicating note locations upon stringed instruments comprises the steps of placing the at least one note position indicator of color upon a flexible planar surface, contrasting a background to the at least one note position indicator of color, aligning the flexible planar surface upon the fingerboard of a stringed instrument, and attaching the planar flexible surface to a stringed instrument fingerboard. The step of placing the at least one note position indicator upon the flexible planar surface preferably comprises placing at least one diatonic scale note position indicator of various colors wherein no two colors are alike, and at least one other half step note position indicator of a color different from any color of the at least one diatonic scale note position indicator upon a flexible planar surface.

The present invention is also a method of locating notes upon stringed instruments using color note position indicators and comprises the steps of assigning colors to at least one fret location upon a planar apparatus to produce note position indicators, aligning the planar apparatus along the fingerboard of a stringed instrument, attaching the planar apparatus between the nut and bridge of the fingerboard of the stringed instrument, and visually identifying note locations by the color of the note position indicators. The step of aligning the planar apparatus along the fingerboard of a stringed instrument preferably comprises aligning the planar apparatus along the fingerboard using fingerboard alignment indicators inset along the sides of the note locator as a guide. Visually identifying note locations by the color of the note position indicators preferably comprises visually identifying diatonic scale note locations by varying colors of the note position indicators, and visually identifying other half step note locations with note position indicators of a single color that is different from any of the colors of the diatonic scale note position indicators. The method of locating notes upon stringed instruments further comprises the step of placing the fingers upon the string in the location of the note position indicator after visually identifying the note location by the color of the note position indicator.

A primary object of the present invention is to precisely indicate to the player the location on the strings where the notes are to be played.

Another object of the present invention is to provide note location information in a manner that is easily ascertained by the novice.

Yet another object of the present invention is to provide note location information in a form which cultivates the commonly used finger action and technique.

Still another object of the present invention is that it by means of color assignment visually indicates the most common musical structure, i.e., the major scale.

A primary advantage of the present invention is that it is easily applied to the instrument itself.

Another advantage of the present invention is that it does not adversely affect sound production.

Still another advantage of the present invention is that it does not damage the instrument.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention is a note locator for stringed instruments that is substantially planar and preferably has an adhesive on the bottom surface of a preferably thin vinyl, or similarly flexible material, top surface. The note locator directly attaches to the fingerboard of the stringed instrument. Note position indicators of various colors upon the note locator give the player visual references to the positioning of fingers on the strings of the instrument.

Figure 1:
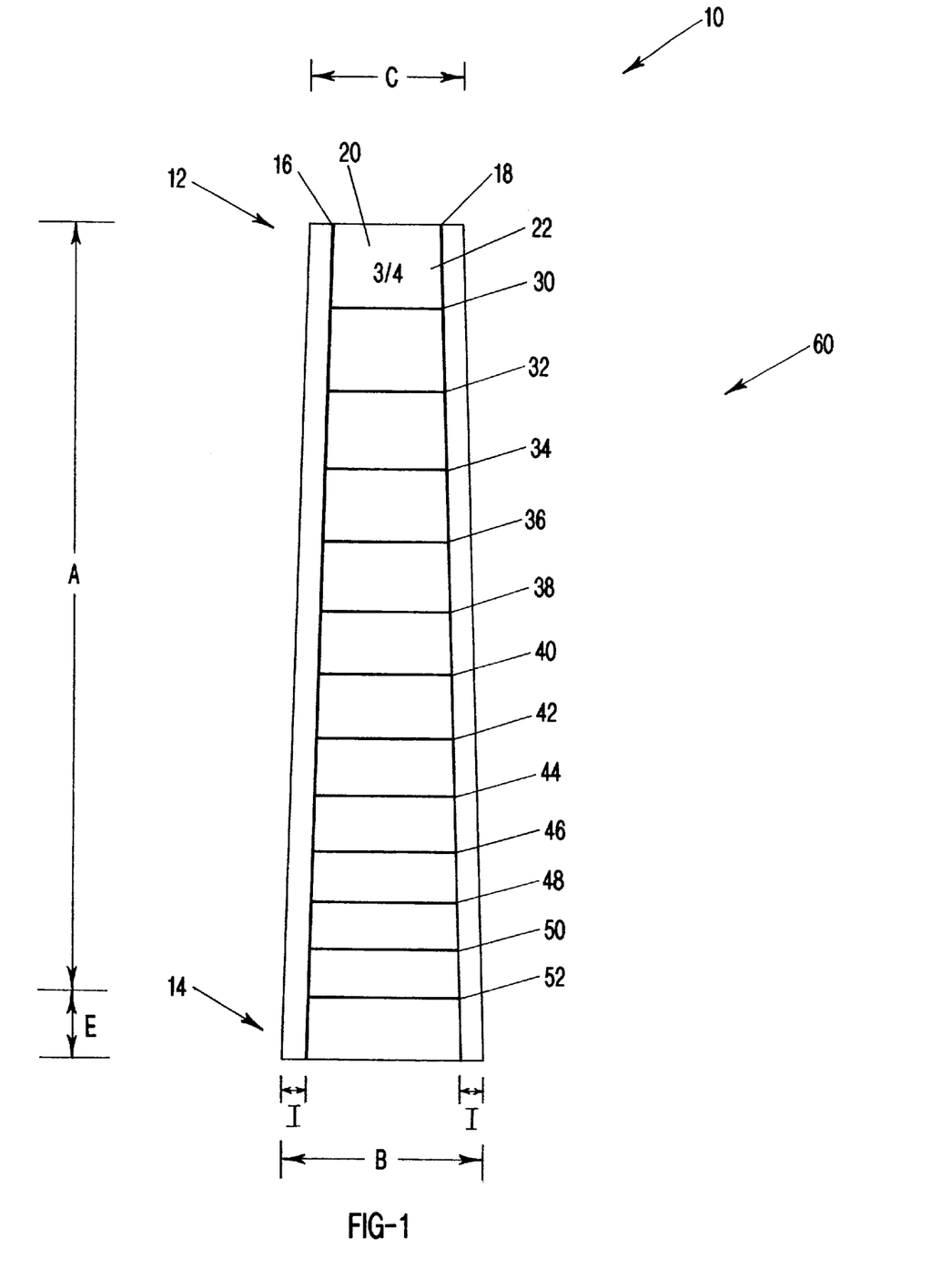
FIG. 1 is a frontal view showing the top surface of the present invention for the full-size violin embodiment.

Attention is now directed to the figures. FIG. 1 shows a frontal view of the preferred embodiment of the present invention that is applicable to the full-size violin. In the preferred embodiment, note locator 10 comprises a thin, flexible film such as vinyl or a similar material, having both a planar top surface and a planar bottom surface. The vinyl is preferably 4 mm clear vinyl, but other types of materials can be used. Preferably, a non-glare coating of mylar, transparent ink, etc., is included upon the vinyl. In order to approximate the size and shape of the lower 60% of the fingerboard of the violin, note locator 10 is preferably an integrally planar trapezoidal apparatus having wider end 14 and narrower end 12. The bottom surface of note locator 10 is preferably coated with an adhesive. In order to protect the adhesive, a paper backing is preferably affixed to note locator 10 until it is applied to the fingerboard. Instrument size indicator 20 is preferably shown at narrow end 12 of note locator 10 but its position can be elsewhere on the apparatus, or it can be omitted altogether.

The top surface of note locator 10 has note position indicators shown generally at 60 of varying colors on contrasting background 22. A pair of fingerboard alignment indicators 16 and 18 outline the edges of the fingerboard and guide the placement of note locator 10 upon the fingerboard of the instrument. Fingerboard alignment indicators 16 and 18 are preferably gray or another non-distracting color so as not to interfere with visual reference to the color note position indicators and serve to aid the user in positioning note locator 10 accurately upon the fingerboard. Note position indicators 60 do not have note names, e.g. C, D, E, adjacent each note position indicator as note names produce visual clutter and train the user to depend upon the note names for cues rather than to gain an independent knowledge of finger placement.

Preferably, twelve note position indicators 60 are used to indicate the position of the notes on the fingerboard. Note position indicators 60 are located transverse to the length of the strings of the fingerboard. Note position indicators 60 and examples for their respective colors, as well as approximate note position indicator distances from narrow end 12 of note locator 10 are described in Table 1 below for a full-sized violin having a string length of approximately 328 mm. The distance from narrow end 12 is the distance to the middle of the respective note position indicator line.

TABLE 1

| Note position indicator | Reference Numeral | Distance from Narrow End (mm) | Color |
|---|---|---|---|
| 1 | 30 | 18.39 | White |
| 2 | 32 | 35.75 | Orange |
| 3 | 34 | 52.14 | White |
| 4 | 36 | 67.60 | Process Yellow |
| 5 | 38 | 82.20 | Red |
| 6 | 40 | 95.99 | White |
| 7 | 42 | 109.00 | Green CV |
| 8 | 44 | 121.27 | White |
| 9 | 46 | 132.87 | Process Magenta |
| 10 | 48 | 143.81 | White |

TABLE 1-continued

| Note position indicator | Reference Numeral | Distance from Narrow End (mm) | Color |
|---|---|---|---|
| 11 | 50 | 154.13 | Process Cyan |
| 12 | 52 | 163.88 | Purple 265 CV |

Preferred overall dimensions for note locator 10 as shown in FIG. 1 for the full-size violin embodiment are as follows: length from narrower end 12 to last note position indicator 52 (A) 163.5 mm; width (B) of wide end 14, 49.2 mm; and width (C) of narrow end 12, 36.5 mm. Length (A) is equal to one-half the string length of the stringed instrument, because note position indicator 52 is one octave away from narrower end 12 which abuts the nut of the instrument. Length (E), beyond (A), is approximately 10–20% of length (A) to provide additional surface area for further identification of the note locator, e.g. a product name. However, length (E) can be much longer to provide additional surface area n note locator 10 for additional note position indicators beyond those shown in FIG. 1.

Fingerboard alignment indicators 16 and 18 are each inset (I), preferably 6.35 mm from the sides of note locator 10; however, other distances from the sides of note locator 10 are of course possible. The widths of fingerboard alignment indicators 16 and 18 are preferably 1.75 mm (or 5 points) for violins and violas of all sizes. Fingerboard alignment indicators 16 and 18 are preferably 2.82 mm (or 8 points) in width for cellos and basses of all sizes. However, fingerboard alignment indicators 16 and 18 can vary between 0.71 mm and 4.24 mm (or 2–12 points) in width for all instruments. Note position indicators 60 are preferably 0.71 mm (or 2 points) in width for all instruments, including violins, violas, cellos, and basses. However, note position indicators 60 can range between 0.36 mm and 2.82 mm (or 1–8 points) in width for all instruments. Although the ranges of widths for note position indicators 60 and fingerboard alignment indicators 16 and 18 can vary, these dimensions are preferred for more accurate finger placement. If the widths of note position indicators 60 are increased too much then the user will encounter greater difficulty finding the precise finger placement and will risk playing out of tune. Conversely, if note position indicators 60 are too narrow in width, then the player will encounter too great of difficulty visually discriminating the location of the indicators.

Note position indicators 60 are most preferably lines of various colors, for example those listed in Table 1. To achieve the necessary and critical precision, the location of note position indicators 60 was calculated mathematically. This is done by applying interval ratios described in texts on musical acoustics to the measured string length of the instrument. The calculations for locations of note position indicators 60 are performed as a percentage of the total string length from the nut which is at the small end of the fingerboard to the bridge which stands on the belly of the instrument beyond the fingerboard. The bridge fixes one end of the string and the player's finger fixes the other end of the string. Therefore, calculations are done from the bridge, which is a fixed point, to the note position indicator, which is the variable point.

In Western musical practice, the octave—or doubling of the frequency of a given note—is divided into twelve successive notes known as semitones. When the division of the octave is such that the frequencies of the twelve tones are a constant ratio from one another, the result is known as the equitempered chromatic scale. Seven of these twelve tones are used to create the most common set, referred to as the major scale. (This can be seen most clearly on the piano keyboard, where starting on the note "C," the seven white keys form the C major scale, and the intermediate five black keys are extraneous to this scale.) By using various combinations of the twelve tones, one can create the same pattern—the major scale—beginning on any of the twelve notes. A "diatonic scale" refers to major, minor, modal, and blues scales and will be understood to encompass all of those scales.

Acoustic values are logarithmic; for instance, an octave is a doubling of frequency. For example, the tuning note "A" is 440 Hz, therefore one octave below "A" is 220 Hz, one octave above is 880 Hz, and two octaves above is 1760 Hz, etc. On a given string, the frequency of a given tone is inversely proportional to the string length. Shorter strings produce higher notes, that is higher frequencies. Therefore, to produce an octave above a certain note on the string, or a doubling of frequency, the string length needs to be halved. Since there are twelve notes in each octave in Western music, the increment of change for each is the twelfth root of two or 1.0594 if rounded to four decimal places. For a given note, for instance 440 Hz, one must multiply it by the twelfth root of two to arrive at the frequency of the next highest note. To calculate the string length necessary to play a given note, the inverse must be performed, that is, the string length of the next lowest note must be divided by the twelfth root of two.

For a given sounding string length (L), the distance (D) from the bridge to a given note position indicator (n) is:

$$D_n = \frac{L}{K^n}$$

where K is the twelfth root of two. A method for calculating accurate placement of the respective note position indicators is derived from the following acoustical principles: for a given string, the string length is inversely proportional to the vibrating frequency of a given note; the vibrating frequencies of a note and of its upper octave are in the rate of 2:1; and the ratio of the frequency of one note of the chromatic scale to the frequency of the next highest note is 1:2–12. The distance (A) from the nut of the instrument, which is at the narrow end of the note locator, to the respective note position indicator is then $$A_n = L - \frac{L}{K^n}$$

For a full-sized violin, having L equal to 328 mm and rounding K to 1.0594, the application of this formula produces note position indicator lines as shown in Table 2.

TABLE 2

| Note position indicator (n) | Divisor ($K^n$) | Distance of Note position indicator from Bridge ($D_n = L/K^n$) mm | Distance of Note position indicator from Narrow End ($A_n = L-L/K^n$) mm |
| --- | --- | --- | --- |
| 1 | K = 1.0594 | L/K = 309.609 | L-L/K = 18.391 |
| 2 | $K^2$ = 1.1223 | $L/K^2$ = 292.25 | $L-L/K^2$ = 35.75 |
| 3 | $K^3$ = 1.189 | $L/K^3$ = 275.863 | $L-L/K^3$ = 52.137 |
| 4 | $K^4$ = 1.2596 | $L/K^4$ = 260.396 | $L-L/K^4$ = 67.604 |
| 5 | $K^5$ = 1.3344 | $L/K^5$ = 245.796 | $L-L/K^5$ = 82.204 |
| 6 | $K^6$ = 1.4137 | $L/K^6$ = 232.014 | $L-L/K^6$ = 95.986 |

TABLE 2-continued

| Note position indicator (n) | Divisor ($K^n$) | Distance of Note position indicator from Bridge ($D_n = L/K^n$) mm | Distance of Note position indicator from Narrow End ($A_n = L-L/K^n$) mm |
| --- | --- | --- | --- |
| 7 | $K^7$ = 1.4977 | $L/K^7$ = 219.005 | $L-L/K^7$ = 108.995 |
| 8 | $K^8$ = 1.5866 | $L/K^8$ = 206.726 | $L-L/K^8$ = 121.274 |
| 9 | $K^9$ = 1.6809 | $L/K^9$ = 195.135 | $L-L/K^9$ = 132.865 |
| 10 | $K^{10}$ = 1.7807 | $L/K^{10}$ = 184.193 | $L-L/K^{10}$ = 143.807 |
| 11 | $K^{11}$ = 1.8865 | $L/K^{11}$ = 173.866 | $L-L/K^{11}$ = 154.134 |
| 12 | $K^{12}$ = 1.9986 | $L/K^{12}$ = 164.118 | $L-L/K^{12}$ = 163.882 |

These formulas calculate correct note position indicator locations for playing in-tune, for example, $K^{12}$ is virtually equal to two, and $L/K^{12}$ is virtually one-half the string length (L) for a full-size violin having string length equal to approximately 328 mm, and any differences can be accounted for by the restriction of K to four decimal places. These calculations are presented as an example for the full-size violin having a string length of approximately 328 mm. However, sounding string lengths can vary for different instruments. For the full-size violin, some can be as high as 330 mm and some as low as 326 mm. Again, while twelve note position indicators 60 are shown, any number of note position indicators may be used on note locator 10 using the above formulation and increasing length (E) as necessary, and will be apparent to those skilled in the art.

Figure 2A:
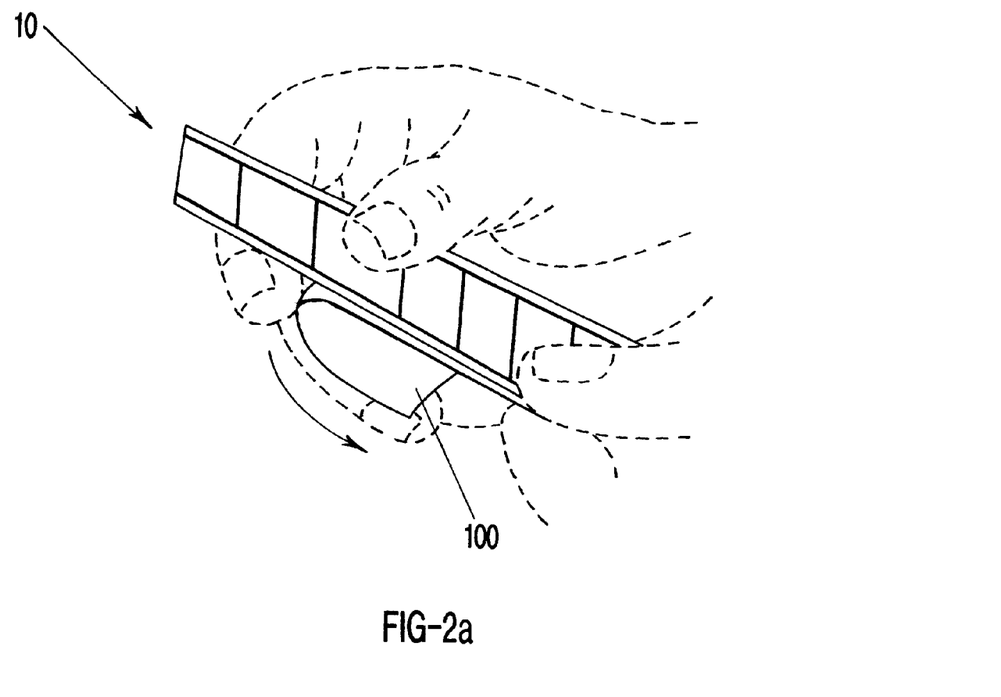
FIG. 2A demonstrates the user separating approximately one inch of the paper backing from the narrow end of the present invention.
Figure 2B:
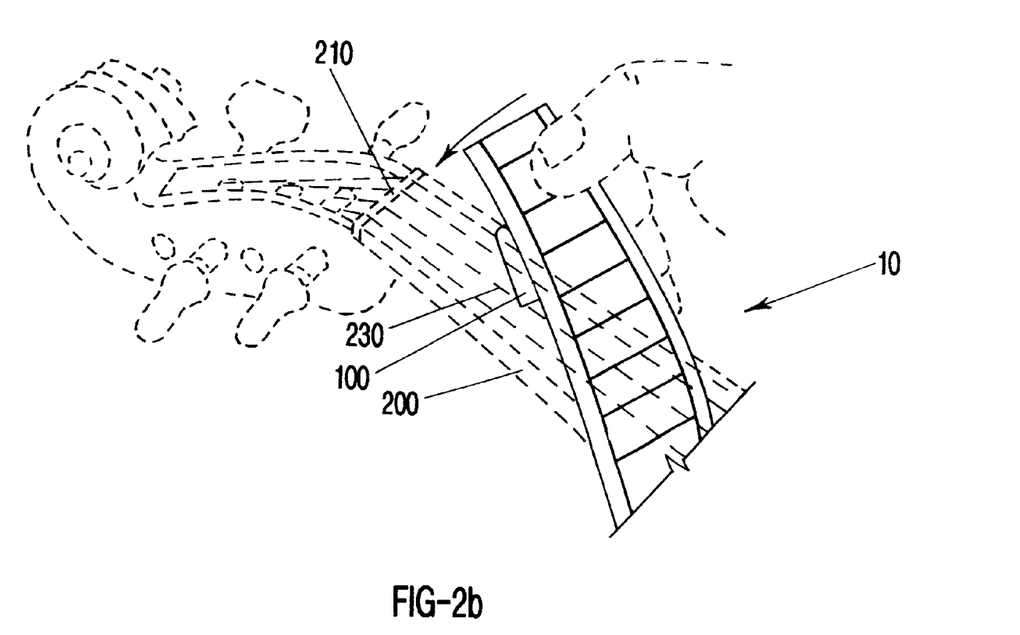
FIG. 2B demonstrates the user sliding the present invention between the fingerboard and strings of the instrument.
Figure 2C:
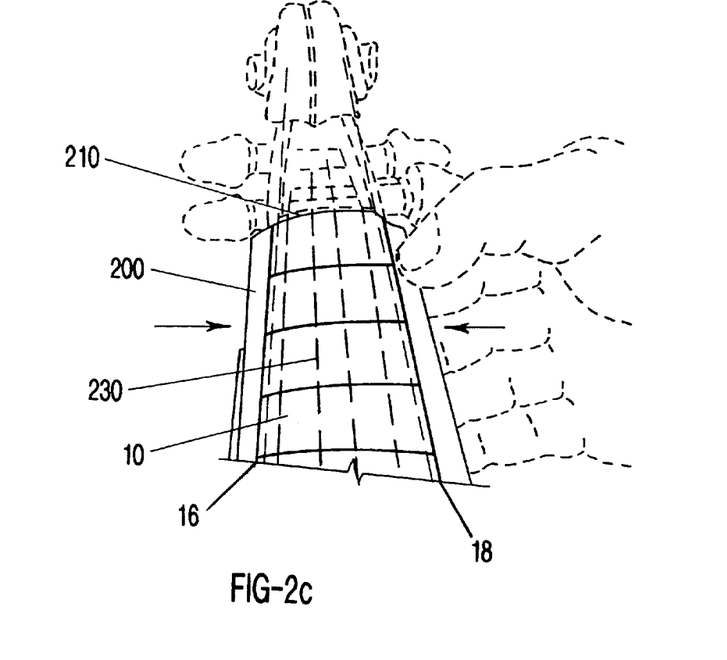
FIG. 2C demonstrates the user aligning the present invention along the fingerboard.
Figure 2D:
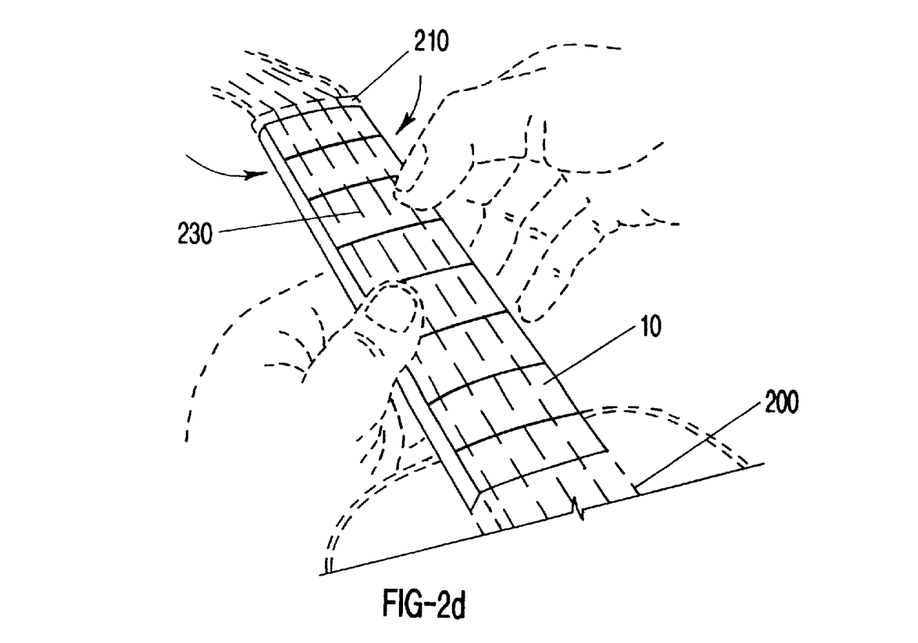
FIG. 2D demonstrates the user pressing the present invention against the fingerboard and against the nut of the instrument.
Figure 2E:
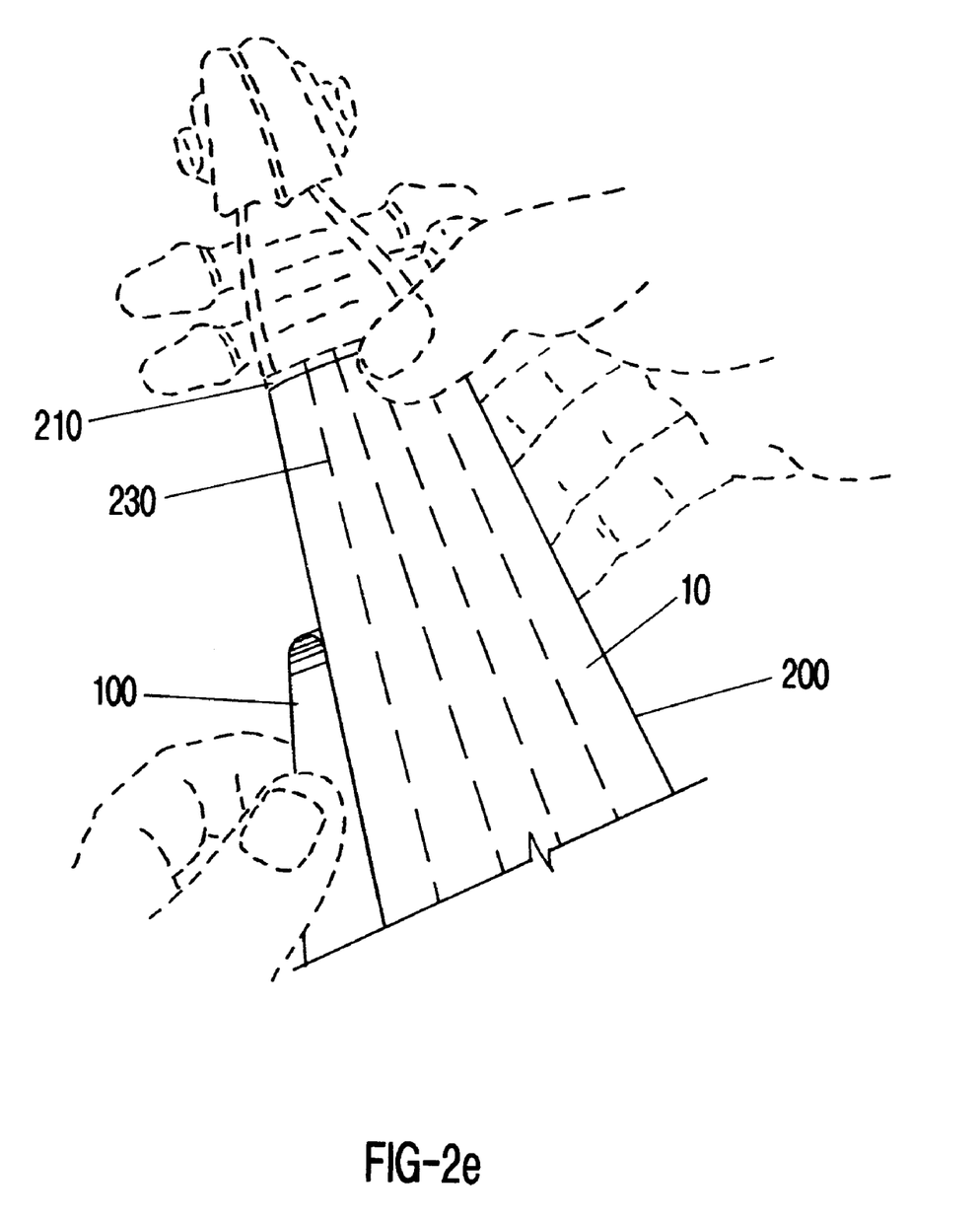
FIG. 2E demonstrates the user removing the remaining backing from the present invention in order to secure it against the fingerboard of the instrument.

Attention is now directed to FIGS. 2A–2E. These figures demonstrate the user affixing note locator 10 to a stringed instrument fingerboard 200. The user first must loosen but not remove strings 230 (shown in FIG. 2B) of the instrument. FIG. 2A demonstrates the user separating approximately 2 cm of backing 100 from narrow end 12 of note locator 10 in order to reveal the adhesive on the bottom surface of note locator 10. FIG. 2B demonstrates the user sliding note locator 10 between fingerboard 200 and strings 230. The user then places narrow end 12 of note locator 10 flush against nut 210 and aligns fingerboard alignment indicators 16 and 18 with fingerboard 200 edges, as shown in FIG. 2C. While maintaining the alignment, the user presses the portion of note locator 10 having backing 100 removed onto fingerboard 200 and against nut 210 as shown in FIGS. 2C and 2D. As shown in FIG. 2E, holding note locator 10 in place at nut 210, the user then removes the remainder of backing 100. Working from the center of note locator 10 to the edges, the user then smooths the entire note locator 10 onto fingerboard 200. Because note locator 10 is flexible, it readily conforms to the curvature of the fingerboard. The overall width of note locator 10 is such that note locator 10 has sufficient overhang from the fingerboard to allow the user to wrap note locator 10 around the sides and under the fingerboard for a secure attachment. This provides structural stabilization for note locator 10 to the fingerboard. Finally, the user tightens strings 230 to return the instrument to its working state. Because note locator 10 is planar, i.e. very thin, in its configuration, it does not in any way interfere with the normal workings of the stringed instrument. At this point, note position indicators 60 are clearly visible to the user through strings 230.

Note locator 10 is shown as being attached to fingerboard 200 using an adhesive; however, other types of attachment means can be used to attach note locator 10 to fingerboard 200, such as hook-and-loop fasteners, straps, or strings that can be tied around the fingerboard of the instrument. Any type of attachment means could be used to attach note locator 10 to fingerboard 200 and would be apparent to those skilled in the art. Preferably, an adhesive that is reusable is used to attach note locator 10 to fingerboard 200 in order to securely attach note locator 10 without damaging the instrument, and without permanently attaching note locator 10 to the instrument. This way note locator 10 can be easily removed. Other adhesives that can be used include permanent adhesives, low tack adhesives, and other reusable type adhesives.

Once note locator 10 is secured to fingerboard 200, note position indicators 60 are in a position to indicate to the user where the fingers are to be placed so as to play the discrete pitches of the equitempered chromatic scale. The color scheme for note position indicators 60, for example as shown in Table 1, allows the player to see clearly the differing placement of fingers for each note. Non-white colors such as those indicated at 32, 36, 38, 42, 46, 50 and 52, and described in Table 1, indicate the notes belonging to that major scale which begins on the unstopped (or "open") string. The color of background portion 22 of note locator 10 is preferably transparent, thereby allowing note position indicators 60 to be clearly seen through strings 230 of the instrument. Other background coloring can be used on note locator 10, however, such as black in order to blend well with the color of fingerboard 200, or any color that provides a good contrast to note position indicators 60 without distracting the user from note position indicators 60.

The complete string length of the stringed instrument, when open, is reduced every time a player depresses the string with a finger. This creates the change of note upon playing the string. Once note locator 10 has been affixed to the top surface of fingerboard 200 of the instrument, it will indicate to the player the location of the actual notes along each of the four strings by means of the colored note position indicators 60. Each of note position indicators 60 indicates a tone of the chromatic scale. The various colored note position indicators as shown at 32, 36, 38, 42, 46, 50 and 52, beginning from narrow end 12 of note locator 10 successively indicate tones of that diatonic scale, in this case a major scale, which begins on the open string. The five white note position indicators as shown at 30, 34, 40, 44 and 48 indicate the other chromatic half steps which are not members of that diatonic scale. For example, purple note position indicator 52 represents the octave above the open string and blue note position indicator 50 represents the 7th degree of the diatonic scale. Many different colors can be used to represent the successive tones of the scale and the five chromatic half steps which are not members of that diatonic scale and would be apparent to those skilled in the art. The invention is not to be limited by the colors described in Table 1. However, this pattern of color note position indicators and non-color note position indicators for the notes of the equitempered diatonic scale is a very useful one to the teacher and beginning student of the stringed instrument.

The design of note locator 10 is extremely simple and avoids visual clutter, such as that in the prior art, which confuses and flusters a student of the instrument. Note locator 10 minimizes the amount of symbols needed to convey the proper finger placement to the student. By memorizing the color scheme and its relationship to the notes of scales, the student rapidly learns finger placement without relying too heavily on an abundance of printed note names or other mechanical devices.

Again, the color scheme described above is one of an infinite set of possibilities that could be applied to note locator 10 without changing its essential design or function. The colors facilitate visual discrimination on the part of the novice. Since each teacher has a slightly different methodology, each can choose a different color scheme, but this individual variance would in no way alter the essence of the present invention. Since pedagogical practice varies widely, a teacher may correlate the note position indicator on a given string either with the placement of specific fingers, with the name of the resultant note (A, B, C, etc.), and/or with its musical notation on the musical staff.

The violin, viola, cello and stringed bass are identical in acoustic principles to that of the full-size violin described above, and beginners have similar problems learning each instrument. A method of adapting the note locator for various other stringed instruments is accomplished by first calculating the ratios of their string lengths to that of the full-sized violin, and then utilizing the scaling ratios thus derived to calculate proportional distances and placements of the note position indicators upon the note locators for each instrument. Therefore, by expanding and contracting note locator 10 for the full-size violin embodiment, the present invention is adapted to many different instruments of the bowed string family. Scaling factors that are shown in Table 3 are arrived at by dividing the measured string length of each instrument by that of the full-sized violin (328 mm). Of course, note locator 10 can be adapted to accommodate many other instruments as well, according to similar measurements and scaling factors, and can include the guitar, mandolin, ukulele, banjo, and many others. The scaling factor for the note position indicator positions as well as the overall size and shape of the note locator to accommodate these other instruments would be apparent to those skilled in the art using the technique described herein. Some scaling factors calculated for the bowed string family are listed in Table 3.

TABLE 3

| Instrument | String Length (L) (mm) | Scaling Factor |
| --- | --- | --- |
| 1/16 violin | 192.89 | 0.590 |
| 1/10 violin | 218.29 | 0.667 |
| 1/8 violin | 243.69 | 0.745 |
| 1/4 violin | 265.11 | 0.8107 |
| 1/2 violin | 282.58 | 0.8641 |
| 3/4 violin | 306.39 | 0.9369 |
| viola | 361.95 | 1.1068 |
| 1/4 cello | 495.3 | 1.5148 |
| 1/2 cello | 590.55 | 1.8058 |
| 3/4 cello | 631.83 | 1.9320 |
| full cello | 698.50 | 2.136 |
| 1/4 string bass | 876.30 | 2.68 |
| 1/2 string bass | 1003.3 | 3.068 |
| 3/4 string bass | 1066.8 | 3.2621 |

The scaling factors listed in Table 3 allow note position indicator locations to be calculated for these other stringed instruments based upon those for the full-sized violin, without using the formula above for each instrument. For example, note position indicators for the 1/10 violin would be located 0.667, or two-thirds, as far from the narrower end, or nut of that instrument, than those of the full-sized violin calculated from the above formula for $A_n$.

The embodiments constructed for the various instruments in Table 3 are precise as to the location of note position indicators 60 along the longitudinal axis of the note locator. However, the widths of the fingerboards of these various instruments do not scale in the same degree as the lengths. Based on a multitude of measurements, widths of note locators for the various instruments listed in Table 3 and inset distances shown as (I) on FIG. 1 for the fingerboard alignment indicators 16 and 18 were constructed as shown in Table 4. As above, length (A) from the nut of the instrument to the twelfth note position indicator is equal to one-half the sounding string length.

TABLE 4

| Instrument | Narrower End Width (mm) | Wider End Width (mm) | Length (A) (mm) | Inset of Fingerboard Alignment Indicators |
|---|---|---|---|---|
| 1/16 violin | 16.66 | 22.23 | 96.4 | 3.18 |
| 1/10 violin | 17.46 | 25.40 | 109.1 | 3.18 |
| 1/8 violin | 19.05 | 27.0 | 121.8 | 3.18 |
| 1/4 violin | 23.81 | 28.58 | 132.6 | 4.76 |
| 1/2 violin | 25.4 | 33.34 | 141.3 | 4.76 |
| 3/4 violin | 28.64 | 39.69 | 153.2 | 6.35 |
| viola | 31.75 | 44.45 | 181.0 | 6.35 |
| 1/4 cello | 31.75 | 47.63 | 247.7 | 6.35 |
| 1/2 cello | 39.69 | 55.56 | 295.3 | 7.94 |
| 3/4 cello | 39.69 | 55.56 | 315.9 | 7.94 |
| full cello | 41.28 | 60.33 | 349.3 | 7.94 |
| 1/4 bass | 50.8 | 76.20 | 438.2 | 9.53 |
| 1/2 bass | 53.98 | 82.55 | 501.7 | 9.53 |
| 3/4 bass | 53.98 | 85.73 | 533.4 | 9.53 |

The note locators for the various stringed instruments listed in Tables 3 and 4 are applied and operate exactly the same way as that of the full-size violin discussed above.

While note locator 10 has been described as being made of a thin vinyl material top surface having an adhesive and a paper backing upon the bottom surface, many other materials may be used, such as a plastic or paper top surface. Other types of adhesives and other types of backings to protect the adhesive can also be used and would be apparent to those skilled in the art. Many different colors can be used for the note position indicators, and of course the number of note position indicators is not to be construed as being limited to just twelve.

Accordingly, it can be seen that note locator 10 is both a unique and a superior solution to one of the fundamental problems of teaching the beginning string player. Through its combination of simplicity of design, precision of execution, and ease of application, the beginning string player may more readily apprehend the positioning of the fingers, thereby enhancing both the rate and pleasure of his or her learning.

Industrial Applicability

The invention is further illustrated by the following non-limiting example.

EXAMPLE

In an actual school setting, beginning string students had no idea where to place their fingers so as to achieve the various notes of the violin. After applying note locator 10 to the instruments, the teacher was able to concretely tell the students that on the D-string (the 3rd), placing the index finger at the orange line, the middle finger on the yellow line, the ring finger on the red line and the little finger on the green line produces the notes E, F-sharp, G and A, which together with the D form the first five notes of the D-major scale. Additionally, the teacher, having a concrete element with which to work, was able to correlate the resultant notes with their notation on the musical staff, and also to begin the process of training the student's aural awareness by demonstrating the different sounds which resulted when a finger was placed off of the line ("out of tune"). It was thus found that note locator 10 aided the students in achieving the proper finger placement and apprehension of major scale construction, and also the teacher in teaching note-reading, ear training and proper technique.

The preceding example can be repeated with similar success by substituting the generically or specifically described operating conditions of this invention for those used in the preceding example.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A note locator for stringed instruments, said note locator comprising:
    a planar top surface comprising
        at least one note position indicator of color other than or in addition to the color white located upon a contrasting background such that said at least one note position indicator is visible upon said contrasting background and so that note positions are indicated by color, and when affixed to the stringed instrument fingerboard said at least one note position indicator is oriented perpendicular to the length of a fingerboard of the stringed instrument and represents a group of notes resulting when pressure is applied to each of strings of the instrument at a same distance from a nut of the instrument; and
    a planar bottom surface affixable to the stringed instrument fingerboard.

2. The note locator of claim 1 wherein said at least one note position indicator comprises a plurality of note position indicators of various distinct colors.

3. The note locator of claim 1 wherein said at least one note position indicator of color comprises at least one note position indicator of color having an absence of note names adjacent said at least one note position indicator of color.

4. The note locator of claim 1 wherein said at least one note position indicator comprises:
    at least one diatonic scale note position indicator; and
    at least one other half step note position indicator.

5. The note locator of claim 4 wherein said at least one diatonic scale note position indicator comprises a plurality of diatonic scale note position indicators of at least one color, and wherein said other half step note position indicator comprises a plurality of other half step note position indicators of at least one color that is different from any of the at least one colors of said plurality of diatonic scale note position indicators.

6. The note locator of claim 4 wherein said at least one diatonic scale note position indicator comprises a plurality of diatonic scale note position indicators, each comprising a distinct color, and wherein said at least one other half step note position indicator comprise the color white.

7. The note locator of claim 1 wherein said note position indicators comprise note position indicators having widths of between approximately 0.36 mm and 2.82 mm.

8. The note locator of claim 7 wherein said note position indicators each comprise a width of approximately 0.71 mm.

9. The note locator of claim 1 wherein said at least one note position indicator comprises twelve note position indicators.

10. The note locator of claim 9 wherein said twelve note position indicators comprise:
    seven diatonic scale note position indicators; and
    five other half step note position indicators.

11. The note locator of claim 1 wherein said top surface contrasting background comprises a transparent material.

12. The note locator of claim 1 wherein said planar bottom surface comprises means for attaching said planar bottom surface to the stringed instrument fingerboard.

13. The note locator of claim 12 wherein said means for attaching comprises an adhesive upon said planar bottom surface.

14. The note locator of claim 13 wherein said adhesive comprises a reusable adhesive for attaching said note locator to the fingerboard securely but not permanently.

15. The note locator of claim 13 wherein said adhesive further comprises a backing adjacent said adhesive upon said planar bottom surface for protecting said adhesive prior to attaching.

16. The note locator of claim 1 wherein said planar top surface and said planar bottom surface comprise an integrally planar trapezoidal apparatus having length greater than width so as to align along the fingerboard of a stringed instrument.

17. The note locator of claim 16 wherein said trapezoidal apparatus comprises a narrower end, and a wider end, wherein said narrower end comprises an approximate width dimension selected from the group of approximate dimensions consisting of 16.7 mm, 17.5 mm, 19.1 mm, 23.8 mm, 25.4 mm, 28.6 mm, 31.8 mm, 39.7 mm, 41.3 mm, 50.8 mm, and 54.0 mm, and wherein said wider end comprises an approximate width dimension selected from the group of approximate dimensions consisting of 22.2 mm, 25.4 mm, 27.0 mm, 28.6 mm, 33.3 mm, 39.7 mm, 44.4 mm, 47.6 mm, 55.6 mm, 60.3 mm, 76.2 mm, 82.6 mm, and 85.7 mm.

18. The note locator of claim 17 wherein each of said at least one note position indicator comprises a note position indicator located an approximate distance, from said narrower end, selected from the group of approximate distances consisting of 18.4 mm, 35.8 mm, 52.1 mm, 67.6 mm, 82.2 mm, 96.0 mm, 109.0 mm, 121.3 mm, 132.9 mm, 143.8 mm, 154.1 mm, and 163.9 mm.

19. The note locator of claim 1 further comprising two sides; and fingerboard alignment indicators upon said planar top surface.

20. The note locator of claim 19 wherein said fingerboard alignment indicators comprise fingerboard alignment indicators having widths between approximately 0.71 mm and 4.24 mm.

21. The note locator of claim 19 wherein said fingerboard alignment indicators comprise fingerboard alignment indicators inset from said sides of said note locator an approximate distance selected from the group of approximate distances consisting of 3.2 mm, 4.8 mm, 6.4 mm, 7.9 mm, and 9.5 mm.

22. The note locator of claim 1 wherein said note locator has dimensions that will accommodate at least one stringed instrument selected from the group of stringed instruments consisting of violins, violas, viols, cellos, and basses.

23. The note locator of claim 1 wherein said note locator has dimensions that will accommodate at least one stringed instrument selected from the group of stringed instruments consisting of guitars, mandolins, ukuleles, banjos, and lutes.

24. The note locator of claim 1 wherein each of said at least one note position indicator, represented by n, where n=the integers 1, 2, 3, . . . , is located upon the note locator at a distance $A_n$ from the nut of the stringed instrument, according to the formula:

$$A_n = L - \frac{L}{K^n}$$

where $K=2^{1/12}$, and L=the sounding string length for the stringed instrument.

25. The note locator of claim 24 wherein L is the sounding string length for a stringed instrument selected from the group of stringed instruments consisting of violins, violas, viols, cellos, and basses.

26. The note locator of claim 24 wherein L is an approximate value selected from the group of approximate values consisting of 192.9 mm, 218.3 mm, 243.7 mm, 265.1 mm, 282.3 mm, 306.4 mm, 328 mm, 362.0 mm, 495.3 mm, 590.6 mm, 631.8 mm, 698.5 mm, 876.3 mm, 1,003.3 mm, and 1,066.8 mm.

27. The note locator of claim 24 wherein L is the sounding string length for a stringed instrument selected from the group of stringed instruments consisting of guitars, mandolins, ukuleles, banjos, and lutes.

28. The note locator of claim 24 wherein n assumes the integer values 1 through and including 12.

29. The note locator of claim 24 wherein L is the sounding string length for the full-sized violin and wherein each of said at least one note position indicators for various other stringed instruments is located at a position calculated via an approximate scaling factor selected from the group of approximate scaling factors consisting of 0.59, 0.67, 0.75, 0.81, 0.86, 0.94, 1.1, 1.5, 1.8, 1.9, 2.1, 2.7, 3.1, and 3.3.

30. A note locator for stringed instruments, said note locator comprising a planar flexible surface comprising:

at least one note position indicator of color located upon a contrasting background to said at least one note position indicator of color such that said at least one note position indicator is visible upon said contrasting background and so that note positions are indicated by color, and when affixed to the stringed instrument fingerboard said at least one note position indicator is oriented perpendicular to the length of a fingerboard of the stringed instrument and represents a group of notes resulting when pressure is applied to each of strings of the instrument at a same distance from a nut of the instrument;

fingerboard alignment indicators; and means for attaching said planar flexible surface to a stringed instrument fingerboard.

31. The note locator of claim 30 wherein said at least one note position indicator of color comprises:

at least one diatonic scale note position indicator, each of a distinct color; and at least one other half step note position indicator of a color different from any color of said at least one diatonic scale note position indicator.

32. A method of indicating note locations upon stringed instruments, the method comprising the steps of:

a) assigning each of at least one note position indicator with a color other than or in addition to the color white upon a planar surface;

b) contrasting the at least one note position indicator of color with a background, such that the note position indicators are visible upon the background and so that note positions are indicated by color; and c) orienting the note position indicators perpendicular to the length of the fingerboard of the stringed instrument thereby representing the group of notes resulting from pressure applied to each of the strings of the instrument at the same distance from the nut of the instrument.

33. The method of claim 32 wherein the step of assigning at least one note position indicator with a color other than or in addition to the color white upon a planar surface further comprises omitting note names adjacent the at least one note position indicator.

34. The method of claim 32 wherein the step of assigning at least one note position indicator with colors upon a planar surface comprises assigning each of at least one diatonic scale note position indicator with a color and each of at least one other half step note position indicator with a color different from any of the colors of the diatonic scale note position indicators upon a planar surface.

35. The method of claim 34 wherein the step of assigning each of the at least one other half step note position indicator with a color that is different from those of the at least one diatonic scale note position indicator comprises coloring each of the at least one half step note position indicator white.

36. The method of claim 32 wherein the step of assigning at least one note position indicator with colors upon a planar surface comprises placing twelve note position indicators of color upon a planar surface.

37. The method of claim 36 wherein the step of placing twelve note position indicators of color upon a planar surface comprises placing seven diatonic scale note position indicators of distinct colors and five other half step note position indicators of a single color different from those of the seven diatonic scale note position indicators upon a planar surface.

38. The method of claim 32 wherein the step of contrasting the at least one note position indicator of color with a background comprises contrasting the at least one note position indicator of color with a transparent background.

39. The method of claim 32 further comprising the step of aligning the planar surface having the at least one note position indicator of color along a stringed instrument fingerboard.

40. The method of claim 39 further comprising the step of attaching the planar surface having the at least one note position indicator of color to a stringed instrument fingerboard.

41. The method of claim 40 wherein the step of attaching the planar surface having the at least one note position indicator of color to a stringed instrument fingerboard comprises attaching the planar surface having the at least one note position indicator of color upon a stringed instrument fingerboard with an adhesive.

42. The method of claim 41 further comprising the step of attaching the planar surface having the at least one note position indicator of color to a stringed instrument fingerboard securely but not permanently.

43. The method of claim 41 wherein the step of attaching the planar surface having the at least one note position indicator of color to a stringed instrument fingerboard further comprises the step of protecting the adhesive with a backing prior to attaching to the stringed instrument fingerboard.

44. The method of claim 32 further comprising the step of shaping the planar surface having the at least one note position indicator of color so that it is trapezoidal and has length greater than width for alignment along the fingerboard of a stringed instrument.

45. The method of claim 44 wherein the step of shaping the planar surface having the at least one note position indicator of color so that it is trapezoidal and has length greater than width comprises:
  a) shaping the planar surface so that it has a narrower end with an approximate width selected from the group of approximate widths consisting of 16.7 mm, 17.5 mm, 19.1 mm, 23.8 mm, 25.4 mm, 28.6 mm, 31.8 mm, 39.7 mm, 41.3 mm, 50.8 mm, and 54.0 mm; and
  b) shaping the planar surface so that it has a wider end having an approximate width selected from the group of approximate widths consisting of 22.2 mm, 25.4 mm, 27.0 mm, 28.6 mm, 33.3 mm, 39.7 mm, 44.4 mm, 47.6 mm, 55.6 mm, 60.3 mm, 76.2 mm, 82.6 mm, and 85.7 mm.

46. The method of claim 45 further comprising the step of locating the note position indicator at an approximate distance from the narrower end of the note locator, selected from the group of approximate distances consisting of 18.4 mm, 35.8 mm, 52.1 mm, 67.6 mm, 82.2 mm, 96.0 mm, 109.0 mm, 121.3 mm, 132.9 mm, 143.8 mm, 154.1 mm, and 163.9 mm.

47. The method of claim 32 further comprising the step of attaching the planar surface having the at least one note position indicator of color upon a stringed instrument selected from the group of stringed instruments consisting of violins, violas, viols, cellos, and basses.

48. The method of claim 32 further comprising the step of attaching the planar surface having the at least one note position indicator of color upon a stringed instrument selected from the group of stringed instruments consisting of guitars, mandolins, ukuleles, banjos and lutes.

49. The method of claim 32 further comprising the steps of:
  a) representing the at least one note position indicator of color by n, where n=the integers 1, 2, 3, . . . ; and
  b) locating the at least one note position indicator upon the note locator at a distance $A_n$ from the nut of the stringed instrument, according to the formula:

$$A_n = L - \frac{L}{K^n}$$

where $K=2^{1/12}$, and L=the sounding string length for the stringed instrument.

50. The method of claim 49 further comprising the step of assigning L the value of the sounding string length for a stringed instrument selected from the group of stringed instruments consisting of violins, violas, viols, cellos, and basses.

51. The method of claim 49 further comprising the step of assigning L an approximate value selected from the group of approximate values consisting of 192.9 mm, 218.3 mm, 243.7 mm, 265.1 mm, 282.3 mm, 306.4 mm, 328 mm, 362.0 mm, 495.3 mm, 590.6 mm, 631.8 mm, 698.5 mm, 876.3 mm, 1,003.3 mm, and 1,066.8 mm.

52. The method of claim 49 further comprising the step of assigning L the value of the sounding string length for a stringed instrument selected from the group of stringed instruments consisting of guitars, mandolins, ukuleles, banjos, and lutes.

53. The method of claim 49 further comprising the step of assigning n the integer values 1 through and including 12.

54. The method of claim 49 further comprising the steps of:
  a) assigning L the sounding string length for the full-sized violin;
  b) scaling the locations of the note position indicators upon the note locator by an approximate scaling factor selected from the group of approximate scaling factors consisting of 0.59, 0.67, 0.75, 0.81, 0.86, 0.94, 1.1, 1.5, 1.8, 1.9, 2.1, 2.7, 3.1, and 3.3; and
  c) adapting the note locator for various other stringed instruments by locating the note position indicators upon the note locator at a distance from the nut of the stringed instrument calculated using the approximate scaling factor.

55. A method of indicating note locations upon stringed instruments, the method comprising the steps of:
 a) placing at least one note position indicator of color upon a flexible planar surface;
 b) contrasting a background upon the flexible planar surface to the at least one note position indicator of color, such that the note position indicators are visible upon the background and so that note positions are indicated by color;
 c) orienting the note position indicators perpendicular to a length of a fingerboard of the stringed instrument thereby representing a group of notes resulting from pressure applied to each of strings of the instrument at a same distance from a nut of the instrument;
 d) aligning the flexible planar surface with the fingerboard of a stringed instrument; and
 e) attaching the planar flexible surface to a stringed instrument fingerboard.

56. The method of claim 55 wherein the step of placing at least one note position indicator of color upon a flexible planar surface comprises placing at least one diatonic scale note position indicator each of various distinct colors and at least one other half step note position indicator of a color different from any color of the at least one diatonic scale note position indicator upon a flexible planar surface.

57. A method of locating notes upon stringed instruments using color note position indicators, the method comprising the steps of:
 a) assigning colors to at least one fret location upon a planar apparatus to produce note position indicators;
 b) orienting the note position indicators perpendicular to a length of a fingerboard of the stringed instrument thereby representing a group of notes resulting from pressure applied to each of strings of the instrument at a same distance from a nut of the instrument;
 c) aligning the planar apparatus along the fingerboard of a stringed instrument;
 d) attaching the planar apparatus between the nut and bridge of the fingerboard of the stringed instrument; and
 e) visually identifying note locations by the color of the note position indicators.

58. The method of claim 57 wherein the step of aligning the planar apparatus along the fingerboard of a stringed instrument comprises aligning the planar apparatus along the fingerboard of a stringed instrument using fingerboard alignment indicators inset along the sides of the note locator as a guide.

59. The method of claim 57 wherein the step of visually identifying note locations by the color of the note position indicators comprises visually identifying diatonic scale note locations by the varying colors of the diatonic scale note position indicators and visually identifying other half step note locations with note position indicators of a single color that is different from any of the colors of the diatonic scale note position indicators.

60. The method of claim 59 further comprising the step of placing the fingers upon the string in the location of the note position indicator after visually identifying the note location by the color of the note position indicator.

* * * * *